United States Patent
Saito et al.

(10) Patent No.: US 7,181,367 B2
(45) Date of Patent: Feb. 20, 2007

(54) OFF-LINE DIAGNOSIS SYSTEM

(75) Inventors: Yoji Saito, Musashino (JP); Kazuhiro Hashizumi, Musashino (JP); Alex Legere, Avon, MA (US); Hongli Du, Avon, MA (US)

(73) Assignees: Dresser, Inc., Addison, TX (US); Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 11/138,583

(22) Filed: May 26, 2005

(65) Prior Publication Data

US 2005/0216232 A1     Sep. 29, 2005

Related U.S. Application Data

(63) Continuation of application No. 10/665,791, filed on Sep. 18, 2003, now Pat. No. 6,941,244.

(30) Foreign Application Priority Data

Sep. 30, 2002  (JP) ............................. 2002-286153

(51) Int. Cl.
 *G06F 11/30* (2006.01)
(52) U.S. Cl. ................. 702/183; 702/182; 702/186
(58) Field of Classification Search ............. 702/33, 702/50, 182, 183, 81, 186, 188; 700/83, 700/104, 117, 275, 280; 706/60
See application file for complete search history.

(56) References Cited

U.S. PATENT DOCUMENTS

| | | | |
|---|---|---|---|
| 4,976,144 A | 12/1990 | Fitzgerald | |
| 5,109,692 A | 5/1992 | Fitzgerald | |
| 5,197,328 A | 3/1993 | Fitzgerald | |
| 5,687,098 A | 11/1997 | Grumstrup et al. | |
| 5,892,690 A | 4/1999 | Boatman et al. | |
| 5,970,430 A | 10/1999 | Burns et al. | |
| 6,049,764 A | 4/2000 | Stahl | |
| 6,108,616 A * | 8/2000 | Borchers et al. | ............ 702/183 |
| 6,272,401 B1 * | 8/2001 | Boger et al. | ................ 700/282 |
| 6,834,258 B2 * | 12/2004 | Schulte et al. | .............. 702/183 |

FOREIGN PATENT DOCUMENTS

| | | |
|---|---|---|
| JP | 10-336238 | 12/1998 |
| WO | WO 01/11436 A1 | 2/2001 |

OTHER PUBLICATIONS

European Patent Office, European Search Report for Application No. EP 03 40 0057 dated Feb. 4, 2005 (3 pages).

* cited by examiner

*Primary Examiner*—Bryan Bui
(74) *Attorney, Agent, or Firm*—Fish & Richardson P.C.

(57) ABSTRACT

Process control systems may include one or more diagnostic systems and/or processes. In particular implementations, a diagnostic system and process for a field instrument may include the ability to divide a signal input range into a plurality of zones with respect to an input axis or a time axis, measure input response characteristics for a zone with the field instrument, and store measurement data points for the zone in memory of the field instrument. The diagnostic system and process may also include the ability to transmit the measurement data points for the zone to a host application and, while transmitting the measurement data points for the zone, measure input response characteristics for a second zone with the field instrument.

20 Claims, 4 Drawing Sheets

OFF-LINE DIAGNOSIS SYSTEM

This application is a continuation of U.S. patent application Ser. No. 10/665,791, filed Sep. 18, 2003 and now U.S. patent No. 6,941,244, which claims the benefit of foreign priority to Japanese Patent Application No. 2002-286153, filed Sep. 30, 2002.

BACKGROUND OF THE INVENTION

1. Field of the Invention

The present invention relates to an off-line diagnosis system in a process control system comprising a host application and field instruments that perform digital communication with the application.

2. Description of the Prior Art

In the prior Japanese patent application 2002-113820 "Off-line diagnosis system," the applicant has disclosed technology concerning an off-line diagnosis system in a process control system comprising a host application and field instruments that perform digital communication with the application.

FIG. 1 is a function block diagram illustrating the technological details of the prior patent application. Block 1 denotes a field instrument (for example, valve positioner), which communicates with a host system to perform process control (measurement, operation, monitoring, etc.). In block 1, numeral 101 denotes a data transmit means, number 102 denotes a data analyzing means, numeral 103 denotes an input-output characteristics measurement means, and numeral 104 denotes a step response measurement means.

Block 2 denotes a host application that runs on a PC or DCS. In block 2, numeral 201 denotes a data receiving means, numeral 202 denotes a data analyzing means, and numeral 203 denotes a data display means. Numeral 3 denotes a digital 1 communication bus that connects between the data transmit means 101 of the field instrument and the data receiving means 201 of the host application.

Note here that the digital communication mentioned above means communication based, for example, on a communication protocol for the process industry, such as Foundation Fieldbus, PROFIBUS, HART or BRAIN.

Both the data analyzing means 102 and 202 may be provided in either field instrument 1 or host application 2, or may be omitted in cases where the operator himself/herself makes analyses using measured data.

If field instrument 1 is a valve positioner, the input-output characteristics of a control valve or a positioner are measured by input-output characteristics measurement means 103, step responses (response characteristics including those of valves) are measured by step response measurement means 104, and the data thus measured are analyzed by the data analyzing means as necessary and uploaded to the data receiving means 201 of host application 2 through data transmit means 101 and digital communication bus 3.

In host application 2, the measured data or analyzed data that has been received is further analyzed by data analyzing means 202 at higher levels as necessary, and the results of analysis are displayed by data display means 203.

In such a system configuration as described above, assume that the speed of communication between data transmit means 101 and data receiving means 201 is insufficient. Then, in such a type of communication as 1200 bps HART communication, the system would not be considered to have a sufficiently high speed to perform real-time processing, though it can successively receive and display measurement results. Therefore, in order to solve the communication speed problem which causes a bottleneck, a practical system requires data memory means as buffers for temporarily retaining measured data within field instrument 1 and host application 2.

To be specific, the data memory means in this case refers to memory resources. Memory resources are also used for other types of signal processing and, therefore, it is sometimes difficult in terms of cost to secure sufficient memory to store the required data.

On the other hand, in measurement for diagnostic purposes, there is a demand for increasing the number of measurement points as much as possible in order to increase the resolution and thereby ensure measurement accuracy, or for obtaining response characteristics data composed of a plurality of step responses. However, it may not be possible to satisfy such a demand if the capacity of data memory means is insufficient.

An object of the present invention is to provide an off-line diagnosis system whereby the measurement resolution (number of measurement points) can be increased in order to obtain detailed input-output characteristics, and step response characteristics can be obtained at a sufficient frequency and more efficiently, without expanding the physically limited memory capacity of a field instrument or host application.

SUMMARY OF THE INVENTION

The constitution of the present invention made to achieve the foregoing object is as follows:

(1) An off-line diagnosis system comprising:
   a field instrument that relates to process control and has a self-diagnosis function or a valve diagnosis function; and
   a host application that performs digital communication with the field instrument, wherein the self-diagnosis of the field instrument is executed or the diagnosis of a valve is executed during an off-line interval and diagnosis results are transmitted to the host application, and wherein the signal input range of the field instrument or the valve is divided into a plurality of zones with respect to the time axis or input axis, and the diagnosis results of each zone are successively transmitted to the host application.

(2) The off-line diagnosis system of item (1), wherein the field instrument retains the diagnosis results data of one zone among the plurality of zones in data memory means with a given memory capacity and, while transmitting the retained data to the host application, also retains the diagnosis results data of another zone in the data memory means to communicate the retained data to the host application.

(3) The off-line diagnosis system of item (1) or (2), wherein the self-diagnosis or valve diagnosis is based on input-output characteristics measurement in which an input is given to the field instrument or valve and then the output value thereof is measured.

(4) The off-line diagnosis system of item (1) or (2), wherein the self-diagnosis or valve diagnosis is based on measurement of response characteristics in which a step input is given to the field instrument and then the output value thereof is measured.

(5) The off-line diagnosis system of any of items (1) to (4), wherein data analyzing systems are provided in either the field instrument or host application or in both.

(6) The off-line diagnosis system of any of items (1) to (5), wherein the field instrument is a valve positioner.

(7) The off-line diagnosis system of any of items (1) to (5), wherein the field instrument is an electro-pneumatic converter.

DETAILED DESCRIPTION OF THE PREFERRED EMBODIMENTS

Figure 1:
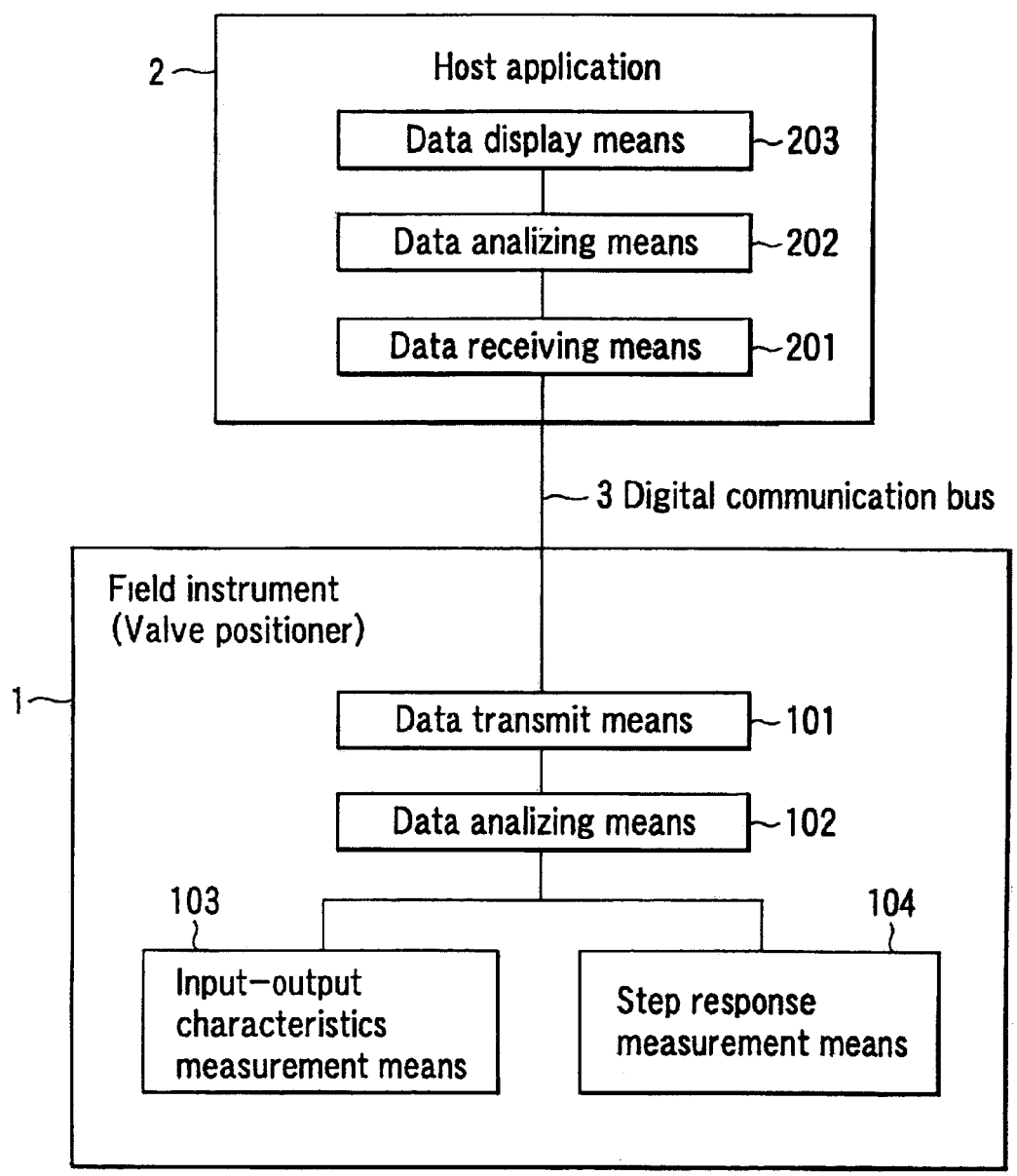
FIG. 1 is a function block diagram illustrating an example of the prior art off-line diagnosis system.
Figure 2:
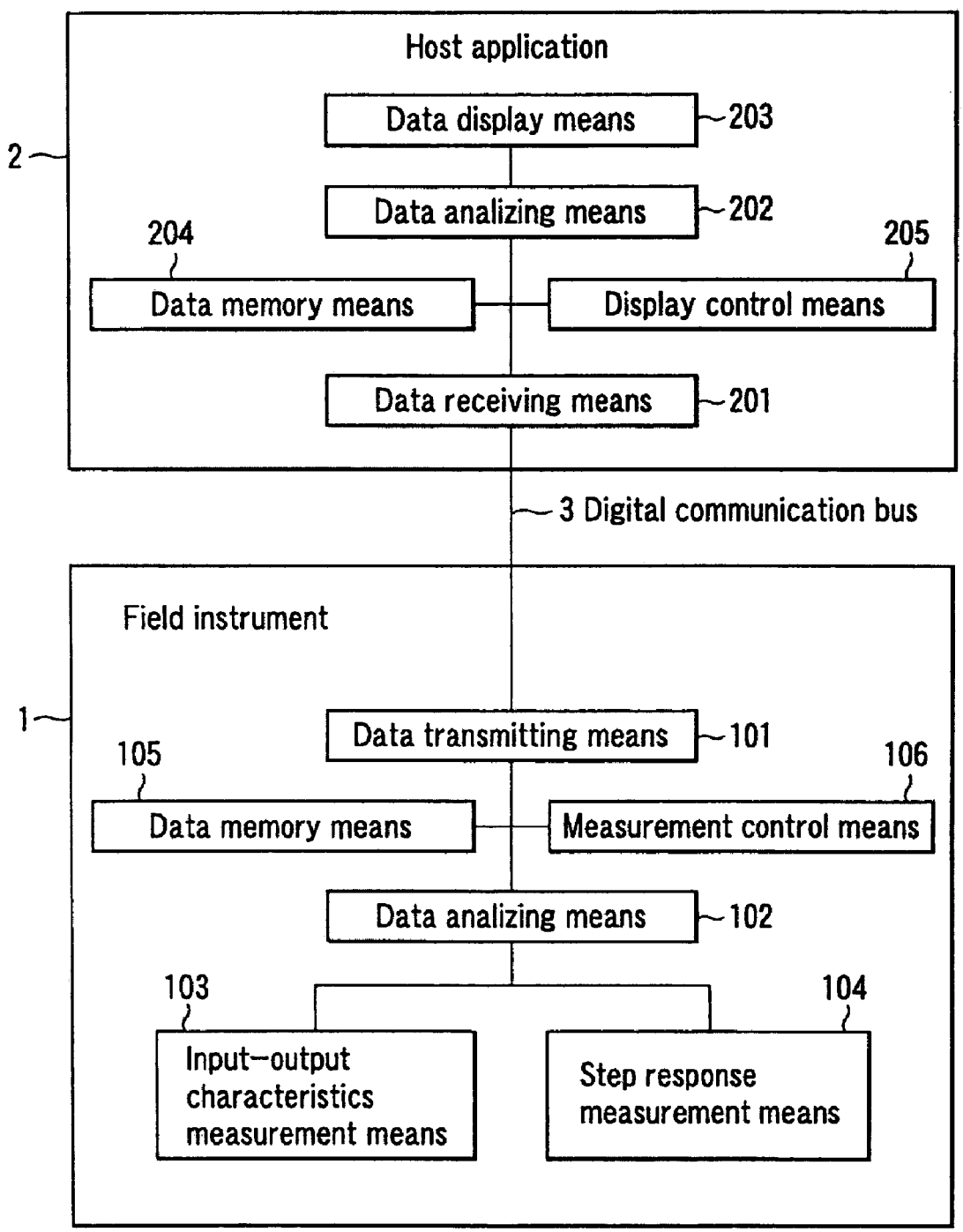
FIG. 2 is a function block diagram illustrating an example of an off-line diagnosis system to which the present invention has been applied.

Preferred embodiments of the present invention will now be described with reference to the accompanying drawings. FIG. 2 is a function block diagram illustrating an example of an off-line diagnosis system to which the present invention has been applied. Elements identical to those discussed in the prior art system of FIG. 1 are referenced alike and excluded from the description hereunder.

In contrast to the prior art system, the system of the present invention is characterized by a configuration in which data memory means 105 and measurement control means 106 are provided in field instrument 1, and data memory means 204 and display control means 205 are provided in host application 2.

The methods of measurement for diagnostic purposes described in the present invention are characterized by the features that the range of dummy inputs is divided into a plurality of zones in field instrument 1 and the diagnosis results of each zone are successively communicated to host application 2.

More specifically, using the functions of measurement control means 106, the diagnosis results data of one zone among a plurality of zones is retained in data memory means 105 with a given capacity.

While transmitting the retained data to the host application, field instrument 1 stores the diagnosis results data of another zone in the data memory means after resetting or overwriting the previous data, and communicates the stored data to host application 2.

In host application 2, the diagnosis results data of one zone received from field instrument 1 is retained in data memory means 204 using the functions of display control means 205 that works in conjunction with measurement control means 106, analyzed by data analyzing means 202, and then displayed by data display means 203.

When the diagnosis results data of another zone is transmitted from field instrument 1, the data is retained in data memory means 204 and the same processing is executed.

Now the measurement methods that characterize the present invention will be described according to FIGS. 3 and 4.

Figure 3:
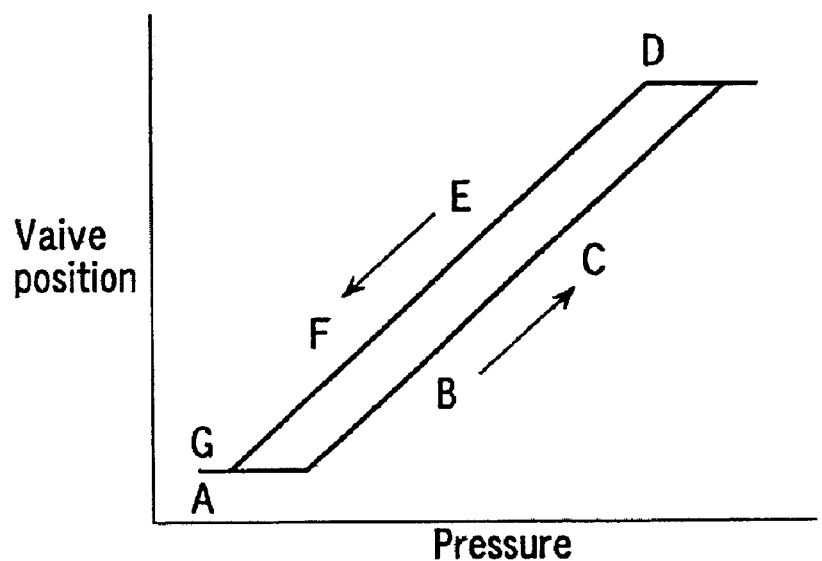
FIG. 3 is a conceptual view showing the method of measuring the input-output characteristics of a valve positioner having hysteresis.

FIG. 3 is a conceptual view showing the method of measuring the input-output characteristics of a valve positioner having hysteresis.

If the data retention capacity of data memory means 105 is n1 measurement points and it is necessary to measure more than n1 points in order to increase the resolution, then the input range of a signal (pressure signal in this case) for diagnosis is divided into a plurality of zones.

In other words, the hysteresis cycle is divided into zones across the path from point A to point G. Then, n1 points are measured in zone A-B and, while the measured data is being transmitted to host application 2, another n1 points are measured in zone B-C. Consequently, it is now possible to measure a number of points greater than n1.

Since the number of zones is 6 in the example of FIG. 2, the following equation holds true assuming the total number of measurement points is n2.

$$n2 = n1_x(\text{number of zones}) = n1_x 6$$

Thus, the resolution is increased by a factor of 6.

Figure 4:
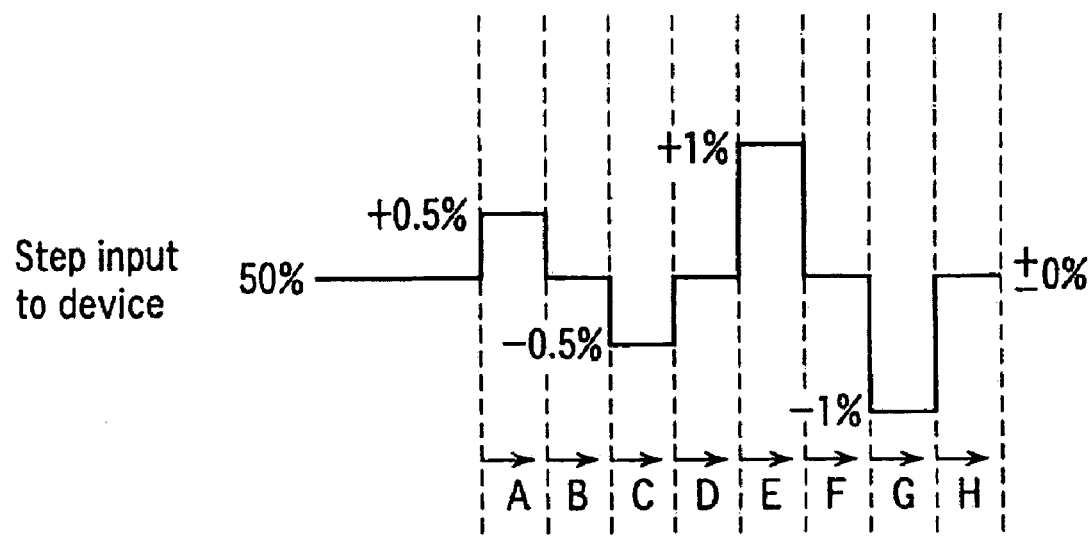
FIG. 4 is a conceptual view showing the method of measuring the step response characteristics of a valve positioner.
Figure 5:
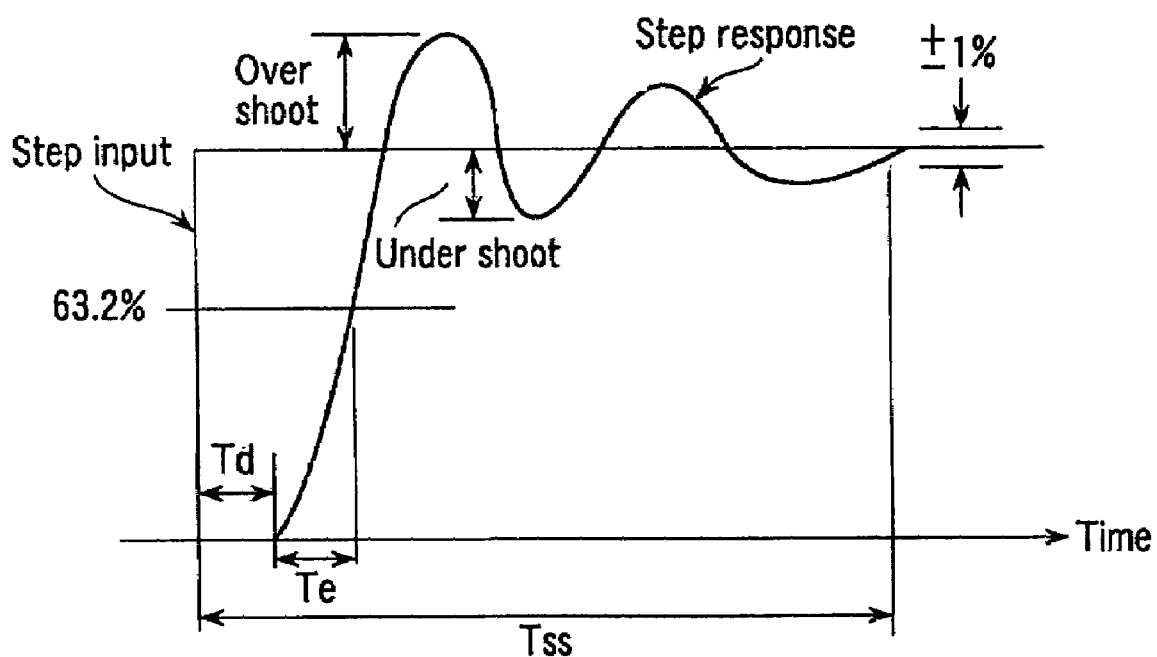
FIG. 5 is a characteristic graph typical of a step response.

FIG. 4 is a conceptual view showing the method of measuring such step response characteristics of a valve positioner as illustrated in FIG. 5. In this example, eight zones from zone A to zone H are measured.

In each zone, n1 points are measured and another step input is given after the completion of measurement of each zone.

In the above-discussed example, dummy inputs at levels around the median level of 50% are given: 50.5% in zone A, 50% in zone B, 49.5% in zone C, 50% in zone D, 51% in zone E, 50% in zone F, 49% in zone G, and 50% in zone H, thus acquiring n1 items of step response data for each zone.

Consequently, the total number of measurement points amounts to $n1_x 8$.

FIG. 5 is a characteristic graph typical of a step response.

Since parameters or the like to be measured and analyzed are well-known, they are not described here.

Other possible methods of providing inputs for measurement of step response characteristics include gradually increasing (or decreasing) the step width, for example, from 0.5% to 1%, 2%, 5%, 10%, and to 20% to test the valve positioner. Alternatively, inputs may be provided at a specific step interval, for example, from 0%, to 25%, 50%, 75%, 100%, 75%, 50%, 25%, and to 0%, to test the up-down step response characteristics of the valve positioner.

As described above, there is no need for repetitively and manually setting the input level from the host application each time the level needs to be changed, thus ensuring extremely high efficiency in measurement of step response characteristics.

In the description of embodiments in accordance with the present invention, although discussions have been made with regard to cases where a valve positioner is adopted as the field instrument, the embodiments may also be applied to the self-diagnosis of the input-output characteristics of an electro-pneumatic converter or motor valve. Furthermore, the embodiments may also be applied to general field instruments other than control means, such as valve positioners or motor valves.

As is evident from the description heretofore given according to the present invention, it is possible to measure data points beyond the capacity of data memory means of a field instrument and thereby to increase the resolution. It is thus possible to easily diagnose valves for a stick-slip phenomenon, for example, that cannot be detected unless a large number of measurement points is sampled.

Furthermore, it is possible to verify the required performance at a time by measuring combined patterns of user-specified particular step responses.

Accordingly, it is possible to easily obtain measured data that is easy to use and useful for users. This advantage will help improve the efficiency of self-diagnosis of field instruments or valves.

What is claimed is:

1. A process-control diagnosis system, the system comprising:
a field instrument for use in a process-control system, the field instrument comprising memory of a predetermined capacity and a data transmitter, the field instrument operable to:
perform a diagnosis function for at least two zones of a signal input range that is divided into a plurality of zones,
store diagnosis results for a first zone in a memory location,
transmit the diagnosis results for the first zone, and
store diagnosis results for a second zone in the memory location, wherein the combined size of the diagnosis results for the first zone and of the diagnosis results for the second zone is larger than the diagnosis-results capacity of the memory location.

2. The system of claim 1, wherein the field instrument is operable to divide the signal input range into the zones.

3. The system of claim 2, wherein the signal input range is divided with respect to an input axis or a time axis.

4. The system of claim 1, wherein the diagnosis function comprises a self-diagnosis function for the field instrument.

5. The system of claim 1, wherein the diagnosis results for the first zone are transmitted while the diagnosis results for the second zone are stored in the memory location.

6. The system of claim 1, further comprising a host application in digital communication with the field instrument, wherein diagnosis results for the first zone and the second zone are successively received by the host application.

7. The system of claim 1, wherein the diagnosis function is based on input-output characteristics measurement, in which an input is given to a component being diagnosed and then an output value thereof is measured.

8. The system of claim 7, wherein the output characteristics are of a valve.

9. The system of claim 7, wherein the diagnosis results comprise measurement data points.

10. The system of claim 1, wherein the field instrument is a valve positioner.

11. The system of claim 1, wherein the field instrument is further operable to:
successively obtain diagnosis results for each zone; and
successively transmit the measurement data points for each zone.

12. The system of claim 1, wherein the memory has a maximum capacity for a predetermined amount of diagnosis results, and the amount of diagnosis results for each zone is less than or equal to the predetermined amount.

13. A method for process-control diagnosis, the method comprising:
performing a diagnosis function for at least two zones of a signal input range that is divided into a plurality of zones with a field instrument;
storing diagnosis results for a first zone in a memory location of the field instrument;
transmitting the diagnosis results for the first zone from the field instrument;
storing diagnosis results for a second zone in the memory location, wherein the combined size of the diagnosis results for the first zone and of the diagnosis results for the second zone is larger than the diagnosis-results capacity of the memory location.

14. The method of claim 13, further comprising dividing the signal input range into the plurality of zones.

15. The method of claim 13, further comprising successively receiving the diagnosis results for the first zone and the second zone at a host application.

16. The method of claim 13, wherein the diagnosis results for the first zone are transmitted while the diagnosis results for the second zone are stored in the memory location.

17. A process-control diagnosis system, the system comprising:
a field instrument for use in a process-control system, the field instrument operable to:
perform a diagnosis function for at least a first zone and a second zone of a signal input range that is divided into a plurality of zones,
successively store diagnosis results for the first zone and diagnosis results for the second zone in a memory, and
successively transmit diagnosis results for the first zone and diagnosis results for the second zone.

18. The system of claim 17, wherein the field instrument is operable to:
store the diagnosis results for the first zone in a memory location,
transmit the diagnosis results for the first zone, and
store the diagnosis results for the second zone in the memory location, wherein the combined size of the diagnosis results for the first zone and of the diagnosis results for the second zone is larger than the diagnosis-results capacity of the memory location.

19. The system of claim 18, wherein the memory has a maximum capacity for a predetermined amount of diagnosis results, and the amount of diagnosis results for each zone is less than or equal to the predetermined amount.

20. The system of claim 17, wherein the field instrument is further operable to:
successively obtain diagnosis results for each zone; and
successively transmit the diagnosis results for each zone.

* * * * *